(12) United States Patent  
Drasovean

(10) Patent No.: US 9,403,248 B2
(45) Date of Patent: Aug. 2, 2016

(54) SHAFT ROTATION AND POSITION SYSTEM

(71) Applicant: Toyota Motor Engineering & Manufacturing North America, Inc., Erlanger, KY (US)

(72) Inventor: Leontin Drasovean, London (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 197 days.

(21) Appl. No.: 14/025,395

(22) Filed: Sep. 12, 2013

(65) Prior Publication Data

US 2015/0068019 A1  Mar. 12, 2015

(51) Int. Cl.
*B62D 65/10* (2006.01)
*B23P 19/06* (2006.01)

(52) U.S. Cl.
CPC ............. *B23P 19/069* (2013.01); *B62D 65/10* (2013.01); *B23P 2700/50* (2013.01); *Y10T 29/4984* (2015.01); *Y10T 29/53687* (2015.01)

(58) Field of Classification Search
CPC .... B23P 19/06; B23P 19/069; B23P 2700/50; B23P 19/067; B23P 21/00; B62D 65/00; B62D 3/10; B62D 5/0451
USPC ..................................................... 29/434, 240
See application file for complete search history.

(56) References Cited

U.S. PATENT DOCUMENTS

| | | | | |
|---|---|---|---|---|
| 1,480,677 | A | * | 1/1924 | Eynon .............................. 470/49 |
| 1,732,038 | A | * | 10/1929 | Connell et al. ................. 318/476 |
| 3,592,884 | A | * | 7/1971 | Williams ............................ 264/5 |
| 4,674,163 | A | | 6/1987 | Nugier |
| 4,909,105 | A | * | 3/1990 | Namiki et al. ................ 81/57.36 |
| 5,079,833 | A | * | 1/1992 | Ebihara et al. ................... 29/818 |
| 5,279,192 | A | | 1/1994 | Hartman |
| 6,626,282 | B1 | * | 9/2003 | Nishizawa et al. ......... 198/465.2 |
| 7,197,810 | B2 | * | 4/2007 | Lutz et al. ..................... 29/564.1 |

* cited by examiner

*Primary Examiner* — David Bryant
*Assistant Examiner* — Lawrence Averick
(74) *Attorney, Agent, or Firm* — Christopher G. Darrow; Darrow Mustafa PC

(57) ABSTRACT

An attachment system includes a friction drive roller subsystem, a nut driver subsystem, and a control subsystem in communication with the friction drive roller subsystem and the nut driver subsystem.

20 Claims, 6 Drawing Sheets

SHAFT ROTATION AND POSITION SYSTEM

BACKGROUND

The present disclosure relates to apparatus useful in the manufacture and repair of a vehicle driveline, and more particularly to installation of a vehicle propeller shaft.

In automotive applications, drive shafts, which are sometimes referred to as drive lines, often utilize propeller or "prop" shafts as torque transmitting components of a vehicle powertrain and are most commonly located under the vehicle between a transmission or other gear box and a differential of a drive axle.

Various equipment useful in the manufacture and repair of vehicle drivelines are often provided in an assembly line environment to facility propeller shaft installation. Typically, the propeller shaft is aligned with the differential and a first set of fasteners tightened. The propeller shaft is then rotated and the remaining fasteners are tightened to secure the propeller shaft. The propeller shaft is typically rotated manually by the operator with both hands to overcome the resistance in the drivetrain or with a custom designed wrench. Oftentimes torque of approximately 40 Nm is required. In either method, the resistance torque of the drivetrain may exceed industry guidelines for ergonomic burden.

The operator is required to rotationally align the propeller shaft with the fastener tightening equipment. Should the rotational alignment not be accurate, the operator walks to the rear differential and again attempts to rotationally align the propeller shaft with the rear differential by manual rotation. The operator then walks back to the fastener tightening equipment to initiate the fastener tightening operation. Furthermore, there is also the potential that after tightening the first set of fasteners, the operator may mistakenly rotate the shaft 90° or 270° instead of 180° which may result in not tightening one of the four fasteners at the propeller shaft/rear differential assembly.

Although effective, this method can be relatively time consuming and ergonomically burdensome.

SUMMARY

An attachment system includes a friction drive roller subsystem, a nut driver subsystem; and a control subsystem in communication with the friction drive roller subsystem and the nut driver subsystem.

An attachment system includes a friction drive roller subsystem along an friction roller axis. A first nutrunner socket is along a first socket axis, the first socket axis parallel to the friction roller axis. A second nutrunner socket along a second socket axis, the second socket axis parallel to the friction roller axis.

A method of mounting a shaft for a vehicle includes rotating a shaft with respect to a nutdriver subsystem via a friction drive roller subsystem; tightening a first set of fasteners; rotating the shaft 180° via the friction drive roller subsystem; and tightening a second set of fasteners.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
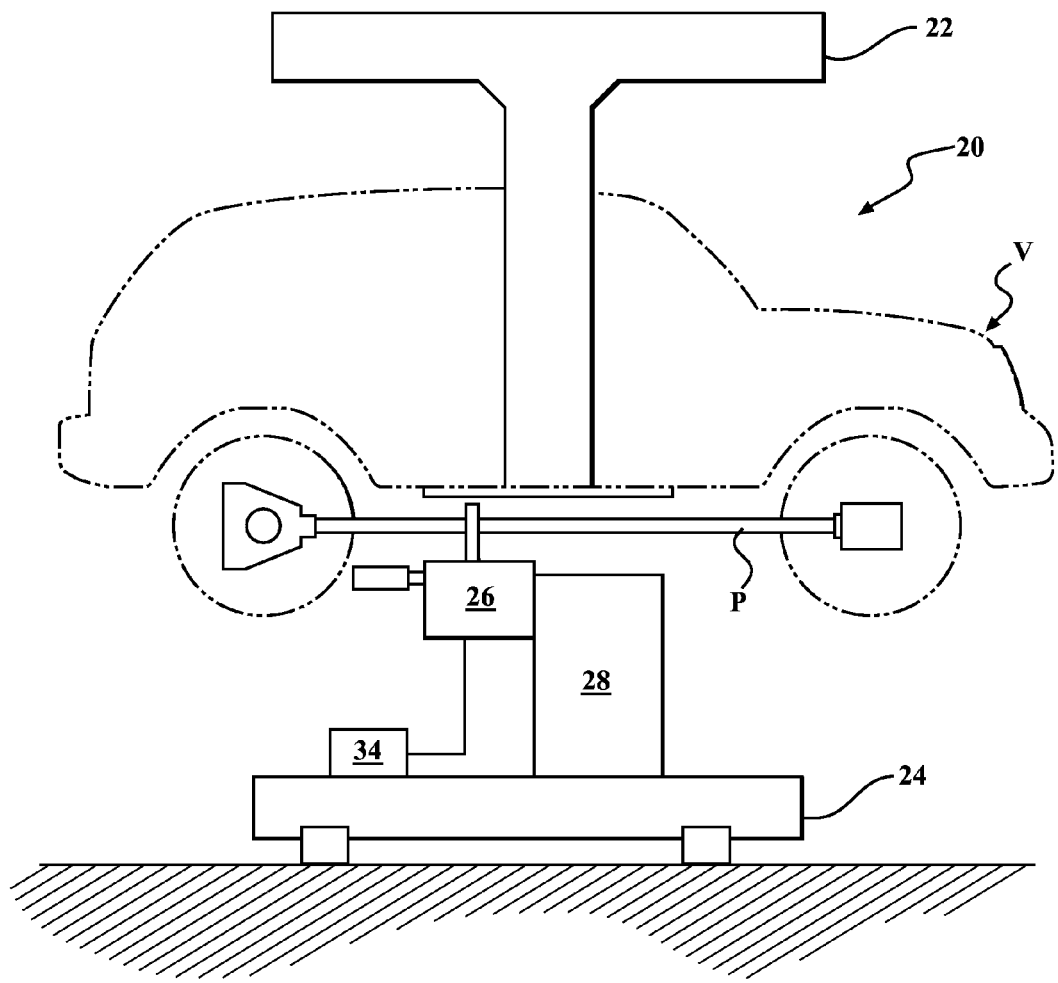
FIG. 1 is a schematic view of a vehicle along an assembly line environment.

FIG. 1 schematically illustrates selected portions of a system 20 useful in the manufacture and repair of a vehicle V. The system 20 generally includes a vehicle carrier 22, an equipment dolly 24, an attachment system 26 and a support structure 28. It should be appreciated that the system 20 may have more, less, or different components than those schematically illustrated.

In one example, the vehicle carrier 22 may extend from an overhead gantry to move the vehicle V (illustrated schematically) along an assembly line environment in which equipment such as the propeller shaft mount system 26 is located on one equipment dolly 24 (partially shown). It should be appreciated that various types of equipment is provided and that the vehicle carrier 22 and equipment dolly 24 are but one arrangement which may be used with the attachment system 26.

The support structure 28 extends and retracts with respect to the equipment dolly 24 to support and position the attachment system 26 with respect to the vehicle V, the propeller shaft P and the rear differential D (all illustrated schematically). The propeller shaft P and the rear differential D may already be mounted to the vehicle V but the propeller shaft P has yet to be secured to the rear differential D. The vehicle V may be, for example, a 4-wheel drive vehicle, however, the attachment system 26 may be utilized with various drive shafts and other tubular members which are to be mounted to a structure at specific rotational orientations.

Figure 2:
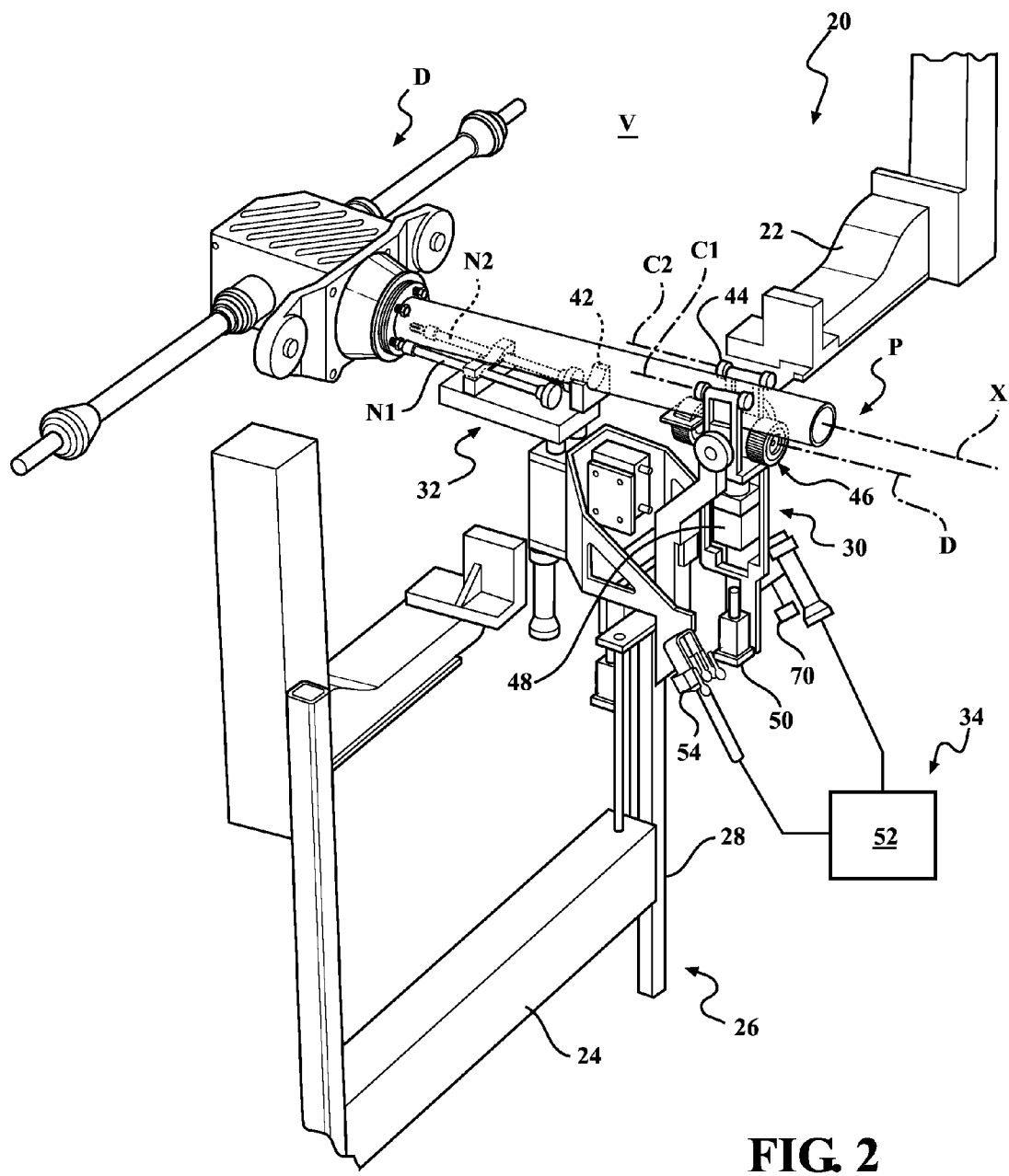
FIG. 2 is a schematic perspective view of a propeller shaft attachment system according to one non-limiting embodiment.

With reference to FIG. 2, the attachment system 26 is operable to rotationally position a shaft or other tubular member such as the propeller shaft P. The attachment system 26 generally includes, a rotator subsystem 30, a nut driver subsystem 32, and a control subsystem 34. The vehicle carrier 22 is moved with respect to the equipment dolly 24 such that the attachment system 26 can be selectively raised into position by the support structure 28 to engage with the propeller shaft P.

The rotator subsystem 30 is mounted to the support structure 28 (illustrated partially) and generally includes a shaft support 42, a clamp subsystem 44, a friction drive roller subsystem 46, a servomotor 48, a clamp actuator 50, a rotation controller 52 and a set of manual actuation switches 54. The support structure 28 is operable to selectively raise and lower the attachment system 26 in response to one or more of the manual actuation switches 54. That is, the support structure 28 selectively moves with respect to the equipment dolly 24 to support and position the rotator subsystem 30, the nut driver subsystem 32, and the control subsystem 34 with respect to the propeller shaft P and the rear differential D (all illustrated schematically).

The shaft support 42 is axially displaced from the friction drive roller subsystem 46 along an axis X which is defined by the propeller shaft P. The shaft support 42 may be a generally arcuate member located on the nut driver subsystem 32 upon which the propeller shaft P may be at least partially supported.

The friction drive roller subsystem 46 includes one or more friction rollers 56, 58 (two shown) selectively driven by the servo motor 48. The friction drive roller subsystem 46 is located generally along an axis D generally parallel to the axis X such that the propeller shaft P is partially supported and rotated thereby.

Figure 4:
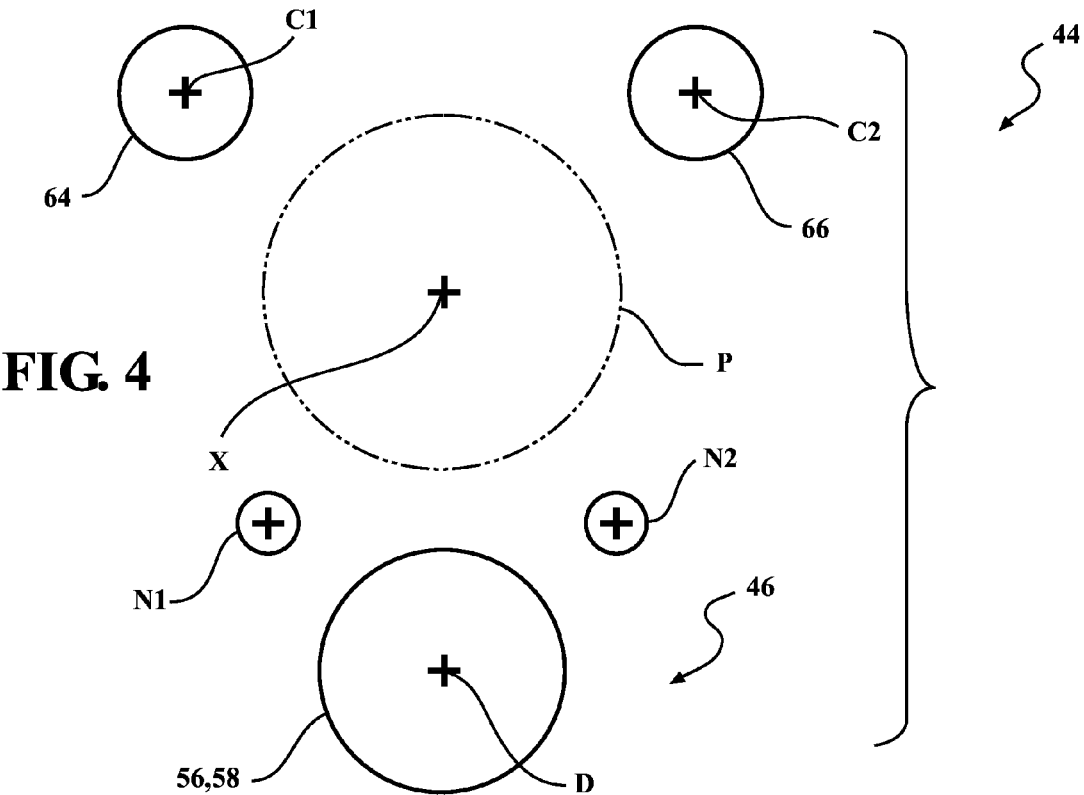
FIG. 4 is a schematic view of the propeller shaft attachment system disengaged from a propeller shaft.
Figure 5:
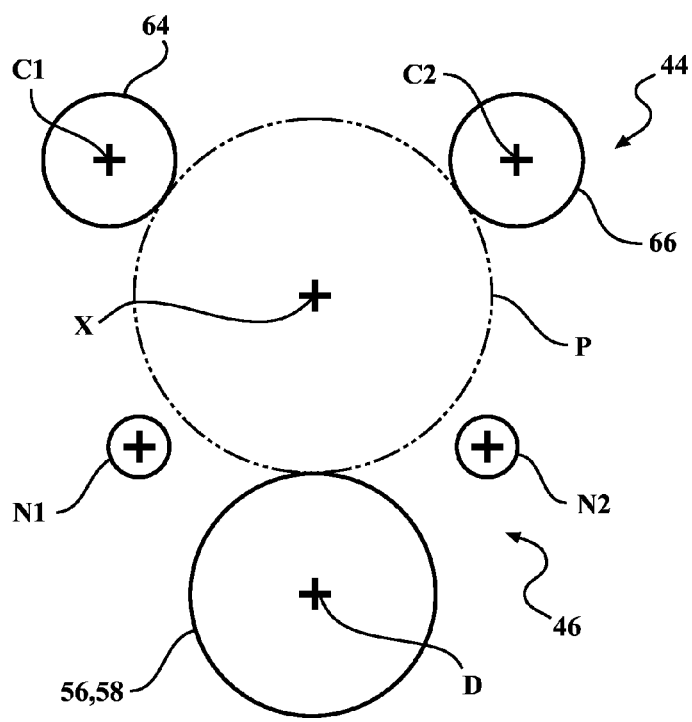
FIG. 5 is a schematic view of the propeller shaft attachment system engaged with propeller shaft.

The clamp subsystem 44 in this disclosed non-limiting embodiment is axially located between the friction rollers 56, 58. The clamp subsystem 44 includes a first arm 60 and a second arm 62 with respective clamp rollers 64, 66 located along respective clamp roller axis C1, C2 that are generally parallel but displaced from the axis X (also shown in FIG. 3). The clamp subsystem 44 may be selectively activated and deactivated by one or more of the manual actuation switches 54. When actuated, the first arm 60 and the second arm 62 pivot such that the respective clamp roller axes C1, C2 are driven toward the axis X. The respective clamp rollers 64, 66 thereby contact the propeller shaft P and maintain the propeller shaft P in contact with the friction rollers 56, 58 (FIGS. 4 and 5).

Figure 3:
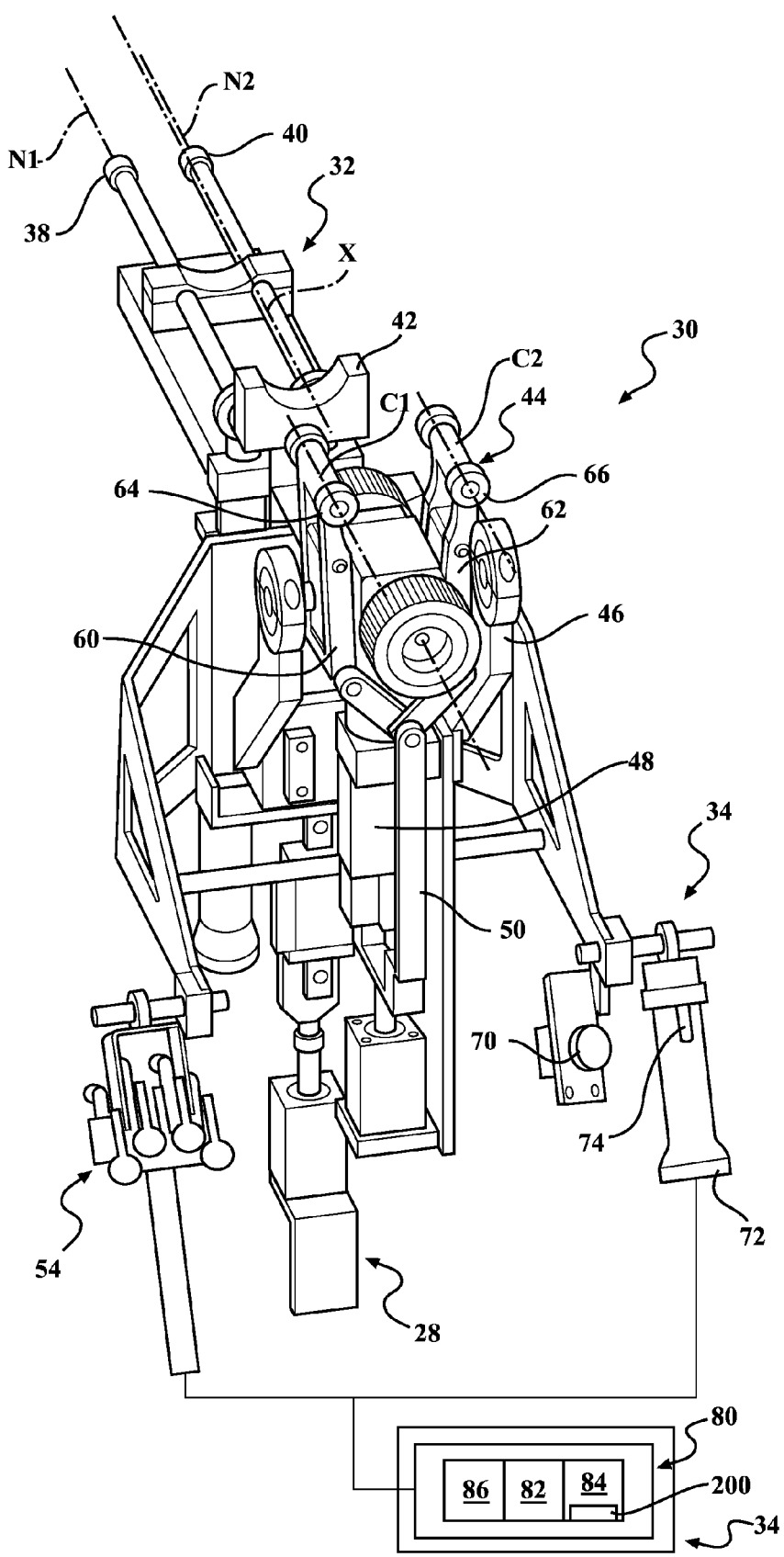
FIG. 3 is an expanded schematic perspective view of the propeller shaft attachment system.

With reference to FIG. 3, the operator may control rotation of the friction drive roller subsystem 46 though a control dial 70 adjacent to a handgrip 72 which are in communication with the rotation controller 52. The rotation controller 52 operates to control the servomotor 48 and may be integral to, or separate from, the control subsystem 34. It should be appreciated that the control subsystem 34 may be centralized or distributed. It should be appreciated that various control inputs may be alternatively or additionally provided. Furthermore, the friction drive roller subsystem 46 may be controlled automatically.

Figure 6:
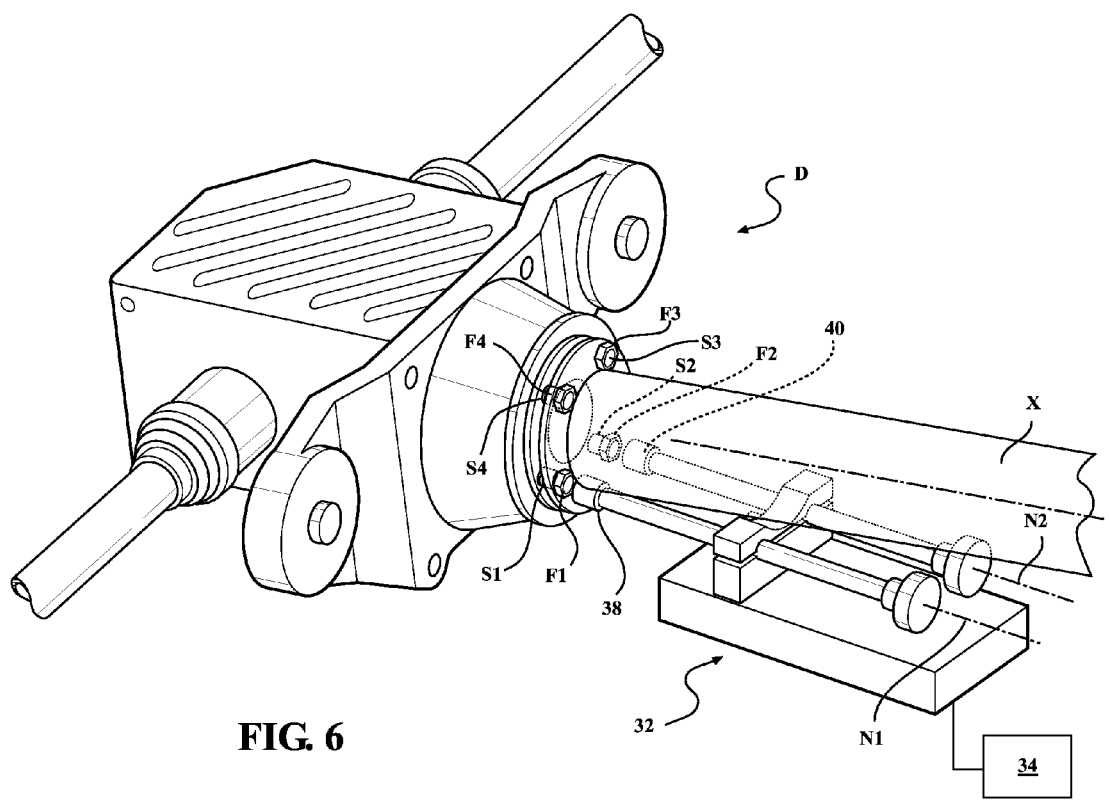
FIG. 6 is an expanded schematic perspective view of the propeller shaft attachment system adjacent a rear differential.

The nut driver subsystem 32 includes nutrunner sockets 38, 40 (two shown) located along respective socket axes N1, N2 that are generally parallel but displaced from the axis X opposite the respective clamp roller axes C1, C2. The socket axes N1, N2 are located within a common plane and are displaced relative to each other such that the nutrunner sockets 38, 40 are positioned to engage fasteners F1-F4 two at a time (FIG. 6). The fasteners F1-F4 may be prepositioned, but yet to be torqued, on studs S1-S4 that extend from the rear differential D (FIG. 6). That is, the fasteners F1-F4 may be located on the studs S1-S4 but not yet torqued to a desired torque to secure the propeller shaft P to the rear differential D. The nutrunner sockets 38, 40 are generally separated to engage two fasteners at a time, e.g., fasteners F1, F2 and fasteners F3, F4 (FIG. 6).

The nutrunner sockets 38, 40 selectively extend and rotate about their respective socket axes N1, N2 in response to, for example, a trigger 74 on the handgrip 72 that communicates with the control subsystem 34.

Figure 7:
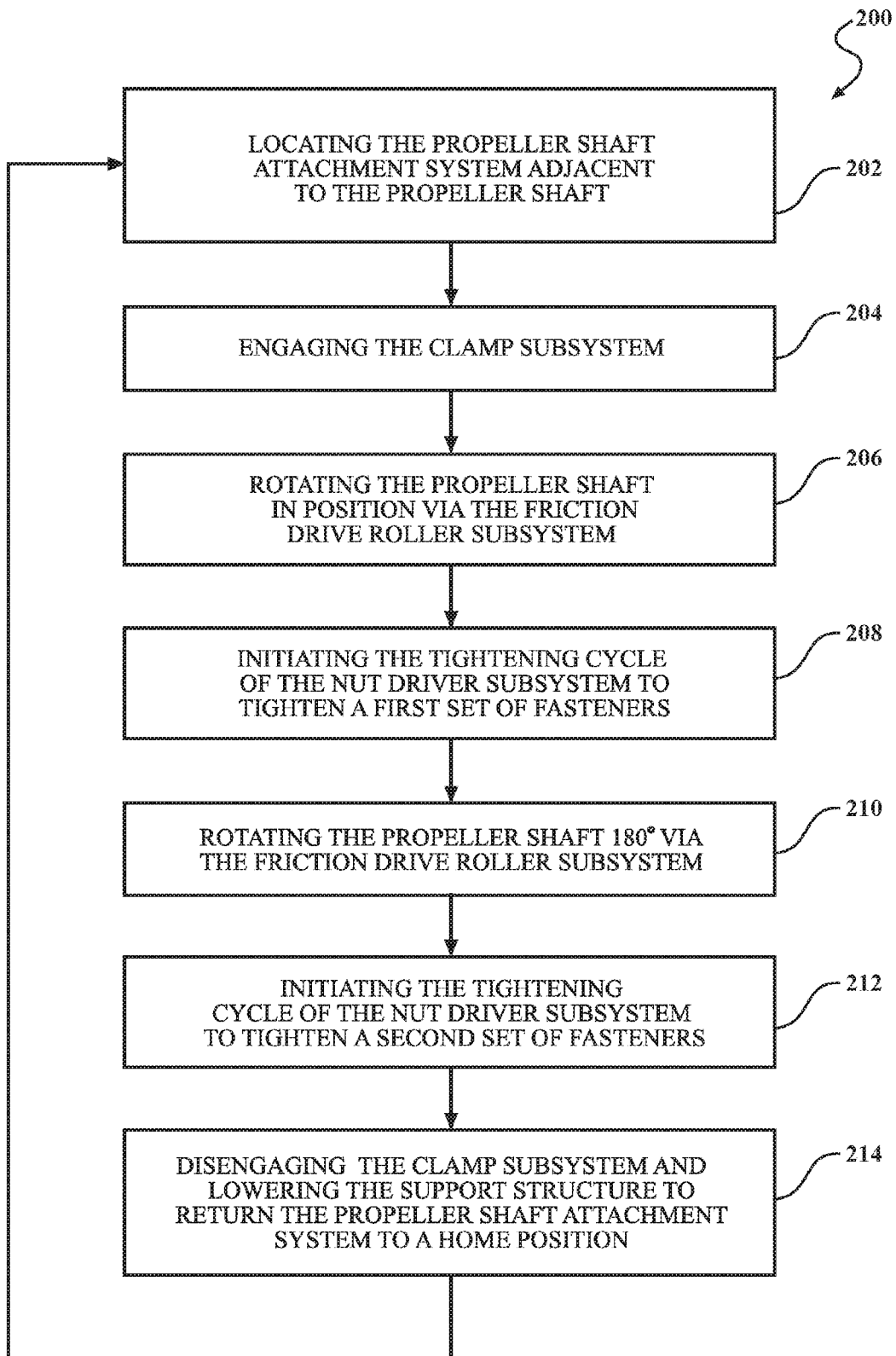
FIG. 7 is a schematic block diagram of an algorithm for operation of the propeller shaft attachment system.

The control subsystem 34 includes a control module 80 having a processor 82, a memory 84, and an interface 86. The processor 82 may be any type of microprocessor having desired performance characteristics. The memory 84 may include any type of computer readable medium which stores the data and control algorithms described herein such as a propeller shaft position algorithm 86 (FIG. 7). The functions of the algorithm 86 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. Other operational software for the processor 82 may also be stored in memory device to provide both manual and automatic Programmable Logic Controller (PLC) inputs. The interface 86 facilitates communication with other subsystems such as the manual actuation switches 54 and the trigger 74. The interface 86 may also include communication with sensor systems such as vehicle weight sensors and other data inputs such as weather information.

With reference to FIG. 7, a method 200 according to one disclosed non-limiting embodiment, initially includes locating the vehicle V with respect to the equipment dolly 24 such that the attachment system 26 may be selectively raised into position by the support structure 28 to engage with the propeller shaft P (step 202).

The operator then engages the clamp subsystem 44. The clamp subsystem 44 locks onto the propeller shaft P and ensures propeller shaft P contact with the friction drive roller subsystem 46 (step 204).

The operator may then rotationally positional the propeller shaft P with the control dial 70 to rotate the propeller shaft P angular position to align the nutrunner sockets 38, 40 of the nut driver subsystem 32 with the fasteners F1-F2 (step 206). This discrete angular adjustment is readily adjusted remotely with the control dial 70 without the operator having to move away from the tightening station thereby completely eliminating the walk time.

The operator then initiates the tightening cycle of the nut driver subsystem 32 with the trigger 74 (step 208). The nut driver subsystem 32 performs the tightening cycle to a predetermined torque. Upon receiving a tightening complete signal from the nut driver subsystem 32, the control module 80 operates the friction drive roller subsystem 46 to rotate the propeller shaft 180° and align the nutrunner sockets 38, 40 of the nut driver subsystem 32 with the fasteners F3-F4 (step 210). That is, when the nut driver subsystem 32 sends a complete signal to the control module 80, the friction drive roller subsystem 46 is operated via the control algorithms of the control module 80.

The operator then again initiates the tightening cycle of the nut driver subsystem 32 with the trigger 74. The nut driver subsystem 32 performs the tightening cycle to a predetermined torque (step 212). In an alternative embodiment, this step may be automated so the operator need not even actuate the trigger 74 this second time.

Upon receiving the tightening complete signal from the nut driver subsystem 32, the control algorithms of the control module 80 disengages the clamp subsystem 44, then lowers the support structure 28 to return the attachment system 26 to a home position on the equipment dolly 24 (step 214).

The attachment system 26 thereby rotates and tightens the propeller shaft P with zero ergonomic burden for the operator. The attachment system 26 also integrates the nutrunner inputs into the PLC program that controls the attachment system 26 to error proof the tightening sequence by execution of the automatic 180° rotation of the propeller shaft P only after receiving confirmation of tightening from the nut driver subsystem 32 thus eliminating potential orientation errors associated with manual operation. In addition, the remote discrete adjustment of propeller shaft rotational position increases efficiency by elimination of operator walk time. The potential for a quality issue due to an operator mistakenly manually rotating the propeller shaft P 90° or 270° rather than the required 180° between tightening cycles is also eliminated.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An attachment system, comprising:
   a friction drive roller subsystem configured to support a shaft and rotate an angular position of said shaft;
   a clamp subsystem configured to engage a circumferential surface of said shaft when said shaft is supported on said friction drive roller subsystem;
   a nut driver subsystem configured to tighten sets of fasteners for said shaft; and
   a control subsystem in communication with said friction drive roller subsystem, said clamp subsystem and said nut driver subsystem, said control subsystem configured to execute operations stored in a memory to:
      with said shaft supported on said friction drive roller subsystem, and with said clamp subsystem engaged to said circumferential surface of said shaft, rotate an angular position of said shaft via said friction drive roller subsystem, and
      tighten a set of fasteners for said shaft via said nut driver subsystem.

2. The system as recited in claim 1, wherein said friction drive roller subsystem includes a first friction roller and a second friction roller along a friction roller axis, said first friction roller and said second friction roller configured to support said shaft and rotate the angular position of said shaft.

3. The system as recited in claim 2, wherein said nut driver subsystem includes a first nutrunner socket and a second nutrunner socket each along a respective socket axis, each of which is configured to tighten a fastener for said shaft.

4. The system as recited in claim 3, wherein said respective socket axes are generally parallel to said friction roller axis.

5. The system as recited in claim 4, wherein said first nutrunner socket and said second nutrunner socket are each axially movable along said respective socket axes.

6. The system as recited in claim 2, wherein said clamp subsystem is axially located between said first friction roller and said second friction roller.

7. The system as recited in claim 6, wherein said clamp subsystem includes a first clamp roller and a second clamp roller, each of which is configured to engage said circumferential surface of said shaft when said shaft is supported on said first friction roller and said second friction roller of said friction drive roller subsystem, and defines a clamp roller axis generally parallel to said friction roller axis.

8. The system as recited in claim 7, wherein said first clamp roller and said second clamp roller are movable with respect to said friction roller axis to engage said circumferential surface of said shaft when said shaft is supported on said first friction roller and said second friction roller of said friction drive roller subsystem.

9. The system as recited in claim 1, wherein said control subsystem is further configured to execute operations stored in a memory to:
   with said shaft supported on said friction drive roller subsystem, actuate said clamp subsystem to engage said circumferential surface of said shaft to maintain said shaft in contact with said friction drive roller subsystem.

10. The system as recited in claim 1, wherein said control subsystem is further configured to execute operations stored in a memory to:
    after tightening said set of fasteners for said shaft via said nut driver subsystem, with said shaft still supported on said friction drive roller subsystem, and with said clamp subsystem still engaged to said circumferential surface of said shaft, rotate said angular position of said shaft via said friction drive roller subsystem 180°, and
    tighten a new set of fasteners for said shaft via said nut driver subsystem.

11. The system as recited in claim 1, wherein said control subsystem is further configured to execute operations stored in a memory to:
    disengage said clamp subsystem from said shaft.

12. An attachment system, comprising:
    a friction drive roller subsystem along an friction roller axis;
    a first nutrunner socket along a first socket axis, said first socket axis parallel to said friction roller axis;
    a second nutrunner socket along a second socket axis, said second socket axis parallel to said friction roller axis; and
    a clamp subsystem that includes a first clamp roller and a second clamp roller, each of which defines a clamp roller axis generally parallel to said friction roller axis.

13. The system as recited in claim 12, wherein said first clamp roller and said second clamp roller are movable with respect to said friction roller axis.

14. The system as recited in claim 13, wherein said friction drive roller subsystem includes a first friction roller and a second friction roller along said friction roller axis.

15. The system as recited in claim 12, further comprising a control subsystem in communication with said friction drive roller subsystem, said a nut driver subsystem and said clamp subsystem.

16. A method of mounting a shaft for a vehicle comprising:
    with a shaft supported on a friction drive roller subsystem, and with a clamp subsystem engaged to a circumferential surface of said shaft to maintain said shaft in contact with said friction drive roller subsystem, rotating an angular position of said shaft with respect to a nut driver subsystem via said friction drive roller subsystem;

tightening a first set of fasteners for said shaft via said nut driver subsystem;
with said shaft still supported on said friction drive roller subsystem, and with said clamp subsystem still engaged to said circumferential surface of said shaft, rotating said angular position of said shaft 180° via said friction drive roller subsystem; and
tightening a second set of fasteners for said shaft via said nut driver subsystem.

17. The method as recited in claim 16, further comprising:
remotely controlling said rotation of said angular position of said shaft with respect to said nut driver subsystem via said friction drive roller subsystem.

18. The method as recited in claim 17, further comprising:
rotating a dial to remotely control said rotation of said angular position of said shaft via said friction drive roller subsystem.

19. The method as recited in claim 16, further comprising:
rotating said angular position of said shaft 180° via said friction drive roller subsystem in response to a signal from said nut driver subsystem.

20. The method as recited in claim 16,
wherein said first set of fasteners includes two fasteners.

\* \* \* \* \*